United States Patent [19]

Kirwin

[11] Patent Number: 4,594,268
[45] Date of Patent: Jun. 10, 1986

[54] METHOD FOR THE CONTROL OF DUST USING METHACRYLATE CONTAINING EMULSIONS AND COMPOSITIONS

[75] Inventor: Ross C. Kirwin, Coraopolis, Pa.

[73] Assignee: Calgon Corporation, Pittsburgh, Pa.

[21] Appl. No.: 717,778

[22] Filed: Mar. 29, 1985

[51] Int. Cl.$^4$ ............................ B05C 1/16; B05D 7/00
[52] U.S. Cl. .................................... 427/136; 427/212; 427/213; 427/214; 427/215; 427/221
[58] Field of Search ............... 427/212, 214, 213, 215, 427/221, 136

[56] References Cited

U.S. PATENT DOCUMENTS

| | | | |
|---|---|---|---|
| 2,854,347 | 9/1958 | Booth et al. | 428/403 X |
| 3,690,727 | 9/1972 | Degginger . | |
| 3,954,662 | 5/1976 | Salyer et al. . | |
| 4,000,992 | 1/1977 | Cole . | |
| 4,087,572 | 5/1978 | Nimerick | 427/214 |
| 4,123,931 | 11/1978 | Blaser | 427/214 X |
| 4,136,050 | 1/1979 | Brehm . | |
| 4,148,941 | 4/1979 | Pape et al. | 427/214 |
| 4,169,170 | 9/1979 | Docksen . | |
| 4,264,333 | 4/1981 | Shaw et al. . | |
| 4,316,811 | 2/1982 | Burns et al. . | |
| 4,400,220 | 8/1983 | Cole . | |
| 4,425,381 | 1/1984 | Walsh | 427/212 X |

*Primary Examiner*—Thurman K. Page
*Attorney, Agent, or Firm*—William C. Mitchell; Michael C. Sudol, Jr.; R. Brent Olson

[57] ABSTRACT

The instant invention is directed to a method for suppressing dust comprising contacting the material being treated with an aqueous emulsion of a methacrylate polymer or a composition comprising a hydrophobic liquid and a methacrylate polymer. These emulsions and compositions may further comprise a wetting-/penetrating surfactant.

14 Claims, No Drawings

METHOD FOR THE CONTROL OF DUST USING METHACRYLATE CONTAINING EMULSIONS AND COMPOSITIONS

BACKGROUND OF THE INVENTION

This invention relates to dust suppression generally and more particularly to dust suppression in mining applications. The use of methacrylate polymers for the purpose of dust suppression is disclosed.

Dust suppression, as used herein, is defined as the prevention or reduction of the extent to which fine particulates become airborne or suspended in air. Dust is generated in significant quantities during the mining, handling, transportation, and storage of coal; dust is also generated during the processing, transportation and handling of rock, ores (for example iron ore), grains, taconite, sulfur, copper, limestone, gypsum, flyash, cement, bauxite and fertilizers (such as potash and phosphates), among others. Road dust is also a problem.

In mining applications, mechanical and chemical methods for dust control are known For example, dust collection equipment is used in mining operations. Also, water is commonly used to prevent dust particles from becoming airborne. Additionally, aqueous solutions containing surfactants may be used for dust control (see U.S. Pat. Nos. 3,690,727 and 4,136,050). Aqueous foam compositions have also been used to suppress dust (see U.S. Pat. Nos. 3,954,662, 4,000,992 and 4,400,220) U.S. Pat. No. 4,316,811 discloses the use of an aqueous solution of polyethylene oxide for dust control. U.S Patent 4,169,170 discloses the use of an aqueous composition comprising an asphalt emulsion or a black liquor lignin product and a water soluble methoxylated alkylphenol or sulfosuccinate wetting agent to form a crust layer which provides protection against the loss of coal due to wind or the action of a coal transportation device.

The instant invention relates to the use of at least one methacrylate polymer for dust suppression. Methacrylate polymers provide efficient dust control when applied to any of a wide variety of materials. After application, these polymers provide a tacky, water-resistant coating which effectively prevents dusting while additionally acting as an antifreeze agent. The instant discovery provides excellent dust suppression relative to contemporary dust suppression formulations.

DESCRIPTION OF THE INVENTION

The instant invention is directed to a method of suppressing dust comprising contacting a dust-producing material with at least one methacrylate polymer, wherein said methacrylate polymer is applied as an aqueous emulsion containing 0.1–50%, by weight, active polymer or as a hydrophobic liquid/polymer composition containing 0.1–30%, by weight, active polymer, and wherein said methacrylate polymer is added at a dosage of at least 0.001 lb active polymer/square yard for surface treatment or 0.001 lb/metric ton for treatment on a weight basis. The preferred dosages range from 0.01 lb active polymer/square yard to 10 lbs active polymer/square yard for surface treatment and 0.01 lb/metric ton to 10 lbs/metric ton for treatment on a weight basis.

Any methacrylate polymer can be used. As used herein, "methacrylate polymers" are those polymers prepared from: (1) monomers having the generic formula $CH_2=C(CH_3)COOR$, wherein R is selected from the group consisting of any straight or branched alkyl group having less than or equal to 12 carbon atoms and preferably having 4–12 carbon atoms, alone or in combination, and (2) one or more of the above-described monomers in combination with any monomer having the generic formula $CH_2=CH-COOR^1$, wherein $R^1$ is H or any straight or branched alkyl group having less than 6 carbon atoms, alone or in combination. Additionally, R and $R^1$ include substituted straight or branched alkyl groups such as 2-ethyl hexyl and 2-ethyl butyl, wherein at least one of the H's of the above defined straight or branched chain alkyl groups is replaced by an alkyl group having three carbons or less.

Preferred methacrylates are homopolymers of methacrylate, methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, 2-ethyl butyl methacrylate, and 2-ethyl hexyl methacrylate, including all isomers thereof.

Molecular weight of the methacrylate polymer used is not critical. However, it is preferred that the methacrylate polymer have a molecular weight in excess of 2,000, as determined by light scattering techniques. Also, any product form can be used. A preferred product form is an aqueous emulsion of poly 2-ethyl hexyl methacrylate containing 35–40% active polymer. Such a product is commercially available from Calgon Corporation as DCL-1803. Another preferred product form is a composition comprising a hydrophobic liquid, such as kerosene, and poly 2-ethyl hexyl methacrylate. Such a product is commercially available from Calgon as DCL-1811.

The most preferred methacrylate is a homopolymer of 2-ethyl hexyl methacrylate.

The term hydrophobic liquid, as used herein, is defined as a fluid which is not miscible with water. Any hydrophobic liquid can be used. The preferred hydrophobic liquids are those selected from the group consisting of mineral oils, fuel oils, diesel fuels or oils, kerosene, naphthas, petroleums, and blends of aromatic and aliphatic hydrocarbons containing four or greater carbon atoms, alone or in combination. The most preferred hydrophobic liquids are those selected from the group consisting of fuel oils, diesel fuels or oils, kerosene, and mixtures of these hydrophobic liquids. Generally, methacrylate polymers are soluble in hydrophobic liquids such as fuel oils, diesel fuels or oils and kerosene.

Compositions comprising at least one methacrylate polymer and at least one hydrophobic liquid can be used. These compositions may contain 0.1 to 30%, by weight, of at least one methacrylate polymer, and the balance at least one hydrophobic liquid. Preferably, these compositions contain 1–10%, by weight, of at least one methacrylate polymer, and the balance at least one hydrophobic liquid.

Blends of methacrylates can be used, as can blends of various hydrophobic liquids. For example, a composition comprising a methacrylate polymer and kerosene may be prepared. The kerosene improves the viscosity properties of the methacrylate polymer. This composition may be further diluted with a second hydrophobic liquid, including but not limited to hydrophobic liquids ranging from diesel fuel to number 5 fuel oil, alone or in combination. The second hydrophobic liquid is preferably heavier and more viscous than the kerosene, thereby promoting better binding of the fine dust particles. The kerosene:heavy second oil ratio in the above composition can range from 1:20 to 20:1, on a weight:weight basis, with the preferred weight ratio being 1:10 to 10:1. The most preferred weight ratio is 1:1 to 1:6.

Aqueous methacrylate polymer emulsions can also be used. Such emulsions may be prepared by conventional emulsion polymerization techniques using emulsifying surfactants. Typically, such emulsion polymerization techniques yield polymer-in-water emulsions which contain 0.1-50%, by weight, polymer solids, with the preferred emulsions containing 20-40%, by weight, polymer solids. These emulsions can be applied to dust-producing materials neat or they can be diluted.

The aqueous polymer emulsions and the hydrophobic liquid/polymer compositions of the instant invention may additionally comprise nonionic or anionic surfactants as wetting/penetration aids. Preferred nonionic surfactants have high HLB (hydrophile-lipophile balance) numbers, i.e. HLB values greater than or equal to 8.0. High HLB values indicate that these surfactants are strongly hydrophilic. The preferred nonionic and anionic surfactants also have good wetting, binding and penetration characteristics.

The preferred surfactants are selected from the group consisting of: (1) nonionic surfactants having an HLB value greater than 8.0, such as polyoxyethylene ethoxylates, polyethylene glycol ethers, alcohol ethoxylates, and alkyl phenol ethoxylates; and (2) anionic surfactants such as phosphate ester-containing surfactants, sulfosuccinates, alkyl sulfates, ethoxylated alkyl phenol sulfates, alkyl ether sulfates, fatty ester sulfates, sulfated alcohol ethoxylates, and salts thereof. The most preferred surfactants are selected from the group consisting of polyethylene glycol ethers of linear alcohols, alkyl phenol ethoxylates, phosphate ester-containing surfactants, alkyl ether sulfates and sulfosuccinates, and salts thereof, including but not limited to sodium and potassium salts. Preferred examples of polyethylene glycol ethers of linear alcohols include, but are not limited to, Tergitol 15S-5, Tergitol 15S-7 and Tergitol 15S-9, all available from Union Carbide Corporation, having 5, 7 and 9 moles EO and approximate HLB values of 10.5, 12.1 and 13.3, respectively.

A preferred alkyl phenol ethoxylate is an ethoxylated octyl phenol (degree of ethoxylation, n = 10) having an HLB value of approximately 13.5. A preferred example of a phosphate ester-containing surfactant is Gafac RS-610, which is described as a phosphate ester free acid with an aliphatic hydrophobic base, which is available from GAF Corporation. Preferred alkyl ether sulfates are sodium salts of alkyl ether sulfates.

Preferred examples of sulfosuccinates include but are not limited to sodium dioctyl sulfosuccinate, such as Aerosol OT-75, disodium ethoxylated alcohol half ester of sulfosuccinic acid, such as Aerosol A-102, and disodium ethoxylated nonylphenol half ester of sulfosuccinic acid, such as Aerosol A-103, all available from American Cyanamid Company.

An effective amount of the surfactant should be used. The term effective amount denotes that amount of surfactant necessary to provide the instant aqueous emulsions and hydrophobic liquid compositions with improved wetting/penetrating/binding qualities. The preferred polymer/surfactant weight ratio is 0.05:1 to 5:1, by weight, based on active polymer. The most preferred ratio is 0.5:1 to 2:1, by weight, based on active polymer.

Combinations of surfactants may also be used to formulate the instant dust suppressants.

The instant polymer/hydrophobic liquid compositions can be formulated using any of several technologies known in the art; for example, these compositions may be prepared using agitated mix tanks.

The dust suppressant compositions and aqueous emulsions of the instant invention are suitable for use on any material prone to create dust, including but not limited to coal, coal refuse, rock, ores (such as iron ore), taconite, sulfur, copper, limestone, gypsum, flyash, cement, bauxite, ash, sinter, coke, mineral concentrates and fertilizers, including but not limited to potash and phosphate fertilizers. These aqueous emulsions and compositions are also excellent agents for the control of road dust.

The dust suppressant compositions and aqueous emulsions of the instant invention are especially effective when applied to coal by any of the commonly known techniques employed in the art, including but not limited to spraying or otherwise contacting the coal with the dust suppressants. Spraying is preferred. The instant method of coal dust suppression involves contacting the coal being treated with the dust suppressant emulsion or composition. Preferably, all of coal being treated, not only the surface of the coal, such as the surface area of a coal pile or the coal in a rail car, is contacted with the emulsion. Thus, a preferred method of treating coal is to spray the coal with the aqueous emulsions or compositions of the instant invention while loading it into a transportation device, such as a rail car, truck or conveying system. However, surface spraying can also be used. Use of the instant dust suppressants minimizes or eliminates dusting of the coal during transport and subsequent handling while additionally protecting against freezing and possibly enhancing the BTU value of the coal. Dust suppression is excellent due to the persistence of the aqueous emulsions and hydrophobic liquid compositions, and due to their ability to agglomerate and bind fine coal particles, i.e. those less than 10 microns in diameter, to more coarse coal.

The instant aqueous emulsions and hydrophobic liquid compositions should be added at a dosage of at least 0.001 lb active polymer/square yard for surface treatment. For total treatment, i.e. treatment on a weight basis, the dosage should be at least 0.001 lb active polymer/metric ton of material being treated. Preferred dosages are 0.01-10 lb/square yard if surface treatment is being used and 0.01-10 lb active polymer/metric ton for total treatment. Most preferred dosages are 0.1-5 lb active polymer/square yard and 0.1-5 lb active polymer/metric ton.

Additionally, the instant aqueous emulsions and hydrophobic liquid compositions can be used to treat mine tunnels and mining faces, especially coal mine tunnels and faces. Thus, the emulsion or composition is sprayed onto the tunnel surface or the mining face at the above-described surface dosage. This treatment may then be followed by dry addition of rock dust, such as limestone dust, or a salt such as $MgCO_3$, $Mg(OH)_2$ or $CaCO_3$. The emulsion or composition holds the dust or salt in place, which then minimizes dusting of the tunnel surface or mining surface so treated. $MgCO_3$, $Mg(OH)_2$ or $CaCO_3$ can also be added directly to the instant emulsions and compositions for one-step treatment.

The following examples further illustrate the instant invention. They should not be construed as in any way narrowing the invention.

EXAMPLE 1

Use of aqueous polymer emulsion as rock dust binding agent.

Calgon DCL-1803 (aqueous emulsion of 2-ethyl hexyl methacrylate containing approximately 37.5%, by weight, active polymer) was diluted with water to produce concentrations of 25%, 50%, and 75%, by weight, DCL-1803 in water. These diluted formulations, and undiluted DCL-1803, were applied to the walls of a coal mine at a dosage of 1 gal/450 ft$^2$. Rock dust was then applied to the treated surface, either by hand (100% and 50% concentrations) or by machine (75% and 25% concentrations). The combined DCL-1803/rock dust treatment provided excellent dust control on the mine surfaces so treated, compared to the conventional use of rock dust alone. The length of time between applications of rock dust (with and without polymer pretreatment) increased from 10–14 days to approximately 3 months, thereby greatly reducing the cost of the dust control program and the manpower necessary to implement it.

EXAMPLE 2

DCL-1803 was diluted to a 0.5%, by weight, solution using water. The diluted product was then applied to coal dust-covered surfaces at a dosage of 1000 gal/acre. The diluted DCL-1803 effectively inhibited dusting and showed significant improvement over conventional $MgCl_2$ treatment.

What is claimed is:

1. A method of suppressing dust comprising contacting a dust-producing material with at least one methacrylate polymer selected from the group consisting of polymers prepared from:
    (1) monomers having the generic formula $CH_2=C(CH_3)COOR$, wherein R is selected from the group consisting of H and any straight or branched chain alkyl group having less than or equal to 12 carbon atoms, alone or in combination; and
    (2) one or more of the monomers of group (1) in combination with any monomer having the generic formula $CH_2=CH-COOR^2$, wherein $R^1$ is H or any straight or branched alkyl group having less than 6 carbon atoms, alone or in combination,
wherein said methacrylate polymer is applied as an aqueous emulsion containing 0.1–50%, by weight, active polymer or as a hydrophobic liquid/polymer composition containing 0.1–30%, by weight, active polymer, and wherein said methacrylate polymer is added at a dosage of at least 0.001 lb/square yard for surface treatment or 0.001 lb/metric ton for treatment on a weight basis.

2. The method of claim 1, wherein said dust-producing material is selected from the group consisting of coal, rock, ores, taconite, sulfur, copper, limestone, gypsum, flyash, cement, bauxite, ash, sinter, coke, mineral concentrtes, fertilizers and road dust.

3. The method of claim 2, wherein said dust-producing material is coal.

4. The method of claim 1, wherein said polymer is poly 2-ethyl hexyl methacrylate.

5. The method of claim 1, wherein said methacrylate polymer is applied as an aqueous emulsion.

6. The method of claim 1, wherein said methacrylate polymer is applied as a hydrophobic liquid/polymer composition.

7. The method of claim 1, wherein said hydrophobic liquid is selected from the group consisting of mineral oils, diesel fuels or oils, kerosene, napthas, petroleums and blends of aromatic and aliphatic hydrocarbons containing four or greater carbon atoms.

8. The method of claim 5, wherein said aqueous emulsion further comprises a wetting/penetrating surfactant.

9. The method of claim 6, wherein said hydrophobic liquid/polymer composition further comprises a wetting/penetrating surfactant.

10. The method of claim 8, wherein said wetting/penetrating surfactant is selected from the group consisting of nonionic surfactants having an HLB value greater than 8.0 and anionic surfactants selected from the group consisting of sulfosuccinates, aklyl sulfates, ethoxylated alkyl phenol surlfates, fatty ester sulfates and alcohol ethoxylates, and salts thereof.

11. The method of claim 9, wherein said wetting/penetrating surfactant is selected from the group consisting of nonionic surfactants having an HLB value greater than 8.0 and anionic surfactants selected from the group consisting of sulfosuccinates, alkyl sulfates, ethoxylated alkyl phenol sulfates, fatty ester sulfates and alcohol ethoxylates, and salts thereof.

12. The method of claim 1, wherein said methacrylate polymer is added on a weight basis and wherein said dosage is 0.01–10 pounds active polymer per metric ton.

13. A method for treating mine tunnels and mining faces comprising:
    (a) contacting said mine tunnel or mining face with at least one methacrylate polymer selected from the group consisting of polymers prepared from:
        (p1) monomers having the generic formula $CH_2=C(CH_3)COOR$, wherein R is selected drom the group consisting of H and any straight or branched chain alkyl group having less than or equal to 12 carbon atoms, alone or in combination; and
        (2) one or more of the monomers of group (1) in combination with any monomer having the generic formula $CH_2=CH-COOR^1$, wherein $R^1$ is H or any straight or branched alkyl group having less than 6 carbon atoms, alone or in combination, wherein said methacrylate polymer is applied as an aqueous emulsion containing 0.1–50%, by weight, active polymer or as a hydrophobic liquid/polymer composition containing 0.1–30%, by weight, active polymer, and wherein said methacrylate polymer is added at a dosage of at least 0.001 lb/square yard for surface treatment; and
    (b) adding rock dust to the polymer-treated surface of said mining tunnel or mining face.

14. The method of claim 13, wherein said mining tunnel or mining face is a coal mine tunnel or face.

* * * * *